(12) United States Patent
Moosaei et al.

(10) Patent No.: US 11,978,107 B2
(45) Date of Patent: May 7, 2024

(54) SYSTEM, METHOD, AND COMPUTER PROGRAM PRODUCT FOR PREDICTING USER PREFERENCE OF ITEMS IN AN IMAGE

(71) Applicant: Visa International Service Association, San Francisco, CA (US)

(72) Inventors: Maryam Moosaei, San Jose, CA (US); Yu-San Lin, Mountain View, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 701 days.

(21) Appl. No.: 17/270,632

(22) PCT Filed: Aug. 26, 2019

(86) PCT No.: PCT/US2019/048094
§ 371 (c)(1),
(2) Date: Feb. 23, 2021

(87) PCT Pub. No.: WO2020/046789
PCT Pub. Date: Mar. 5, 2020

(65) Prior Publication Data
US 2021/0390606 A1     Dec. 16, 2021

Related U.S. Application Data

(60) Provisional application No. 62/813,851, filed on Mar. 5, 2019, provisional application No. 62/725,430, filed on Aug. 31, 2018.

(51) Int. Cl.
*G06Q 30/0601* (2023.01)
*G06N 3/02* (2006.01)
(Continued)

(52) U.S. Cl.
CPC ........... *G06Q 30/0631* (2013.01); *G06N 3/02* (2013.01); *G06N 3/04* (2013.01); *G06Q 30/0269* (2013.01);
(Continued)

(58) Field of Classification Search
CPC ............... G06Q 30/02; G06Q 30/0269; G06Q 30/0282; G06Q 30/06; G06Q 30/0601;
(Continued)

(56) References Cited

U.S. PATENT DOCUMENTS 8,103,551 B2   1/2012   Saul et al.
8,249,941 B2   8/2012   Saul et al.
(Continued)

FOREIGN PATENT DOCUMENTS

WO   2017142361 A1   8/2017
WO   2017203262 A2   11/2017

OTHER PUBLICATIONS

Han et al., Learning Fashion Compatibility with Bidirectional LSTMs, ACM, MM '17, Oct. 2017, 1078-1086. (Year: 2017).*
(Continued)

*Primary Examiner* — Shane D Woolwine
(74) *Attorney, Agent, or Firm* — The Webb Law Firm

(57) ABSTRACT

Systems, methods, and computer program products for predicting user preference of items in an image process image data associated with a single image with a first branch of a neural network to produce an image embedding, the single image including a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple
(Continued)

items from the neural network based on the joint embedding, the user preference score including a prediction of whether the user prefers the set of multiple items.

20 Claims, 7 Drawing Sheets

(51) Int. Cl.
  *G06N 3/04* (2023.01)
  *G06Q 30/02* (2023.01)
  *G06Q 30/0251* (2023.01)
  *G06Q 30/0282* (2023.01)
  *G06Q 30/06* (2023.01)
  *G06T 7/00* (2017.01)

(52) U.S. Cl.
  CPC ......... *G06Q 30/0282* (2013.01); *G06Q 30/06* (2013.01); *G06Q 30/0601* (2013.01); *G06T 7/0002* (2013.01); *G06Q 30/02* (2013.01)

(58) Field of Classification Search
  CPC ........ G06Q 30/0631; G06N 3/02; G06N 3/04; G06N 3/042; G06N 3/045; G06N 20/00; G06N 20/10; G06N 20/20; G06T 7/0002
  See application file for complete search history.

(56) References Cited

U.S. PATENT DOCUMENTS

| | | | |
|---|---|---|---|
| 9,015,093 | B1 | 4/2015 | Commons |
| 9,070,171 | B2 | 6/2015 | Guo et al. |
| 9,147,207 | B2 | 9/2015 | Haaramo et al. |
| 9,727,620 | B2 | 8/2017 | Kang |
| 10,614,342 | B1 * | 4/2020 | Lorbert ................ G06V 10/764 |
| 2010/0205541 | A1 | 8/2010 | Rapaport et al. |
| 2012/0308121 | A1 | 12/2012 | Datta et al. |
| 2014/0310304 | A1 | 10/2014 | Bhardwaj et al. |
| 2016/0379352 | A1 | 12/2016 | Zhang et al. |
| 2018/0012110 | A1 | 1/2018 | Souche et al. |
| 2018/0046882 | A1 | 2/2018 | Carroll et al. |
| 2018/0089541 | A1 | 3/2018 | Stoop et al. |
| 2018/0232451 | A1 | 8/2018 | Lev-Tov et al. |

OTHER PUBLICATIONS

Deng et al., "ImageNet: A Large-Scale Hierarchical Image Database", 2009 IEEE Computer Vision and Pattern Recognition, pp. 248-255.

Huang et al., "Densely Connected Convolutional Networks", 2017 IEEE Conference on Computer Vision and Pattern Recognition, pp. 2261-2269.

Kang et al., "Visually-Aware Fashion Recommendation and Design with Generative Image Models", 2017, arXiv preprint arXiv:1711.02231, 10 pages.

Qian et al., "Personalized Recommendation Combining User Interest and Social Circle", IEEE Transactions on Knowledge and Data Engineering, 2014, pp. 1763-1777, vol. 26, No. 7.

Vaccaro et al., "The Elements of Fashion Style", UIST, 2016, Tokyo, Japan, pp. 777-785.

Wang et al., "Utilizing Related Products for Post-Purchase Recommendation in E-commerce", RecSys, 2011, Chicago, Illinois, 4 pages.

* cited by examiner

SYSTEM, METHOD, AND COMPUTER PROGRAM PRODUCT FOR PREDICTING USER PREFERENCE OF ITEMS IN AN IMAGE

CROSS REFERENCE TO RELATED APPLICATIONS

This application is the United States national phase of International Application No. PCT/US2019/048094 filed Aug. 26, 2019, and claims the benefit of U.S. Provisional Patent Application No. 62/725,430, filed Aug. 31, 2018, and U.S. Provisional Patent Application No. 62/813,851, filed Mar. 5, 2019, the disclosures of which are hereby incorporated by reference in their entirety.

BACKGROUND

1. Field

This disclosure relates to systems, methods, and computer program products for predicting whether a user prefers (e.g., likes, etc.) items in an image.

2. Technical Considerations

Understanding preferences of individuals, such as fashion tastes of individuals, and/or the like, may lead to significant benefits in multiple aspects. For consumers, such understanding may help the consumers to choose everyday outfits and/or to decide which apparel items to purchase. For merchants, such understanding may boost revenues by adding recommendation modules to online and/or physical stores of the merchants. However, fashion taste is a complicated concept that may be difficult to grasp.

Recently, a new service has been surfacing in the fashion industry: the recommendation system. Personal shopping services, such as Affinity, StitchFix, and/or the like, recommend fashion items to consumers for purchase based on the fashion tastes of the consumers. However, making a high-quality fashion recommendation based on fashion tastes of an individual may involve major challenges. For example, a recommendation for a set of items that together form a fashion outfit may be more meaningful to the individual than a recommendation for a single item. As an example, many data sources from which fashion tastes can be learned may consist of extremely sparse connections between individuals and the fashion outfits liked, created, and/or purchased by the individuals, which may lead to a data sparsity issue. Accordingly, there is a need in the art for improving prediction of user preference for items.

SUMMARY

Accordingly, provided are improved systems, devices, products, apparatus, and/or methods for predicting user preference for items in an image.

According to some non-limiting embodiments or aspects, provided is a computer-implemented method for predicting user preference of items in an image, including: processing, with at least one processor, image data associated with a single image with a first branch of a neural network to produce an image embedding, wherein the single image includes a set of multiple items; processing, with at least one processor, a user identifier of a user with a second branch of the neural network to produce a user embedding; concatenating, with at least one processor, the image embedding with the user embedding to produce a concatenated embedding; processing, with at least one processor, the concatenated embedding with the neural network to produce a joint embedding; and generating, with at least one processor, a user preference score for the set of multiple items from the neural network based on the joint embedding, wherein the user preference score includes a prediction of whether the user prefers the set of multiple items.

In some non-limiting embodiments or aspects, the method further includes: web crawling, with at least one processor, at least one web site to retrieve a plurality of positive images associated with the user, wherein each of the plurality of positive images includes a positive set of multiple items; associating, with at least one processor, the plurality of positive images with the user identifier of the user; and training, with at least one processor, the neural network based on the plurality of positive images associated with the user identifier of the user.

In some non-limiting embodiments or aspects, the method further includes: receiving, with at least one processor, at least one other image, wherein the at least one other image includes another set of multiple items, and wherein the at least one other image is not associated with the user; determining, with at least one processor, a distance between the at least one other image and at least one positive image of the plurality of positive images associated with the user; determining, with at least one processor, the at least one other image as at least one negative image including a negative set of multiple items based on the distance satisfying a threshold distance; associating, with at least one processor, the at least one negative image with the user identifier of the user; and training, with at least one processor, the neural network based on the at least one negative image associated with the user identifier of the user.

In some non-limiting embodiments or aspects, the first branch of the neural network includes a first fully-connected layer with first weights, the second branch of the neural network includes a second fully-connected layer with second weights, and the concatenated embedding is processed with a third fully-connected layer of the neural network with third weights to produce the joint embedding.

In some non-limiting embodiments or aspects, the method further includes: adjusting, with at least one processor, the first weights, the second weights, and the third weights, based on back propagation using a loss function applied to the user preference score for the set of multiple items.

In some non-limiting embodiments or aspects, the method further includes: generating, with at least one processor, a plurality of user preference scores for a plurality of sets of multiple items; ranking, with at least one processor, the plurality of sets of multiple items based on the plurality of user preference scores for the plurality of sets of multiple items; determining, with at least one processor, one or more sets of multiple items of the plurality of sets of multiple items that satisfy a threshold ranking; and providing, with at least one processor, information associated with the one or more sets of multiple items to a user device of the user.

In some non-limiting embodiments or aspects, the method further includes: processing, with at least one processor, the image data associated with the single image with at least one convolutional neural network to produce a feature vector for the single image, wherein the feature vector is processed with the first branch of the neural network to produce the image embedding.

In some non-limiting embodiments or aspects, the method further includes: encoding, with at least one processor, the user identifier into a one-hot encoding vector in which an index of the vector associated with the user is 1 and a remainder of the index values is 0, wherein the one-hot encoding vector is processed with the second branch of the neural network to produce the user embedding.

In some non-limiting embodiments or aspects, the single image includes a plurality of elements of a matrix, the plurality of elements of the matrix includes the image data associated with the single image, and the matrix includes a number of elements that is greater than a number of items in the set of multiple items.

In some non-limiting embodiments or aspects, the set of multiple items includes at least one of the following: at least one clothing item, at least one furniture item, at least one landscaping item, at least one graphical user interface item, at least one architectural item, at least one artwork item, or any combination thereof.

According to some non-limiting embodiments or aspects, provided is a system for predicting user preference of items in an image including: at least one processor programmed and/or configured to: process image data associated with a single image with a first branch of a neural network to produce an image embedding, wherein the single image includes a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple items from the neural network based on the joint embedding, wherein the user preference score includes a prediction of whether the user prefers the set of multiple items.

In some non-limiting embodiments or aspects, the at least one processor is further programmed and/or configured to: web crawl at least one web site to retrieve a plurality of positive images associated with the user, wherein each of the plurality of positive images includes a positive set of multiple items; associate the plurality of positive images with the user identifier of the user; and train the neural network based on the plurality of positive images associated with the user identifier of the user.

In some non-limiting embodiments or aspects, the at least one processor is further programmed and/or configured to: receive at least one other image, wherein the at least one other image includes another set of multiple items, and wherein the at least one other image is not associated with the user; determine a distance between the at least one other image and at least one positive image of the plurality of positive images associated with the user; determine the at least one other image as at least one negative image including a negative set of multiple items based on the distance satisfying a threshold distance; associate the at least one negative image with the user identifier of the user; and train the neural network based on the at least one negative image associated with the user identifier of the user.

In some non-limiting embodiments or aspects, the first branch of the neural network includes a first fully-connected layer with first weights, the second branch of the neural network includes a second fully-connected layer with second weights, and the concatenated embedding is processed with a third fully-connected layer of the neural network with third weights to produce the joint embedding.

In some non-limiting embodiments or aspects, the at least one processor is further programmed and/or configured to: adjust the first weights, the second weights, and the third weights, based on back propagation using a loss function applied to the user preference score for the set of multiple items.

In some non-limiting embodiments or aspects, the at least one processor is further programmed and/or configured to: generate a plurality of user preference scores for a plurality of sets of multiple items; rank the plurality of sets of multiple items based on the plurality of user preference scores for the plurality of sets of multiple items; determine one or more sets of multiple items of the plurality of sets of multiple items that satisfy a threshold ranking; and provide information associated with the one or more sets of multiple items to a user device of the user.

In some non-limiting embodiments or aspects, the at least one processor is further programmed and/or configured to: process the image data associated with the single image with at least one convolutional neural network to produce a feature vector for the single image, wherein the feature vector is processed with the first branch of the neural network to produce the image embedding.

In some non-limiting embodiments or aspects, the at least one processor is further programmed and/or configured to: encode the user identifier into a one-hot encoding vector in which an index of the vector associated with the user is 1 and a remainder of the index values is 0, wherein the one-hot encoding vector is processed with the second branch of the neural network to produce the user embedding.

In some non-limiting embodiments or aspects, the single image includes a plurality of elements of a matrix, wherein the plurality of elements of the matrix includes the image data associated with the single image, and wherein the matrix includes a number of elements that is greater than a number of items in the set of multiple items.

In some non-limiting embodiments or aspects, the set of multiple items includes at least one of the following: at least one clothing item, at least one furniture item, at least one landscaping item, at least one graphical user interface item, at least one architectural item, at least one artwork item, or any combination thereof.

According to some non-limiting embodiments or aspects, provided is a computer program product including at least one non-transitory computer-readable medium including one or more instructions that, when executed by at least one processor, cause the at least one processor to: process image data associated with a single image with a first branch of a neural network to produce an image embedding, wherein the single image includes a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple items from the neural network based on the joint embedding, wherein the user preference score includes a prediction of whether the user prefers the set of multiple items.

Further non-limiting embodiments or aspects are set forth in the following numbered clauses:

Clause 1. A computer-implemented method for predicting user preference of items in an image, comprising: processing, with at least one processor, image data associated with a single image with a first branch of a neural network to produce an image embedding, wherein the single image includes a set of multiple items; processing, with at least one processor, a user identifier of a user with a second branch of the neural network to produce a user embedding; concatenating, with at least one processor, the image embedding with the user embedding to produce a concatenated embedding; processing, with at least one processor, the concatenated embedding with the neural network to produce a joint embedding; and generating, with at least one processor, a user preference score for the set of multiple items from the neural network based on the joint embedding, wherein the user preference score includes a prediction of whether the user prefers the set of multiple items.

Clause 2. The computer-implemented method of clause 1, further comprising: web crawling, with at least one processor, at least one web site to retrieve a plurality of positive images associated with the user, wherein each of the plurality of positive images includes a positive set of multiple items; associating, with at least one processor, the plurality of positive images with the user identifier of the user; and training, with at least one processor, the neural network based on the plurality of positive images associated with the user identifier of the user.

Clause 3. The computer-implemented method of clauses 1 or 2, further comprising: receiving, with at least one processor, at least one other image, wherein the at least one other image includes another set of multiple items, and wherein the at least one other image is not associated with the user; determining, with at least one processor, a distance between the at least one other image and at least one positive image of the plurality of positive images associated with the user; determining, with at least one processor, the at least one other image as at least one negative image including a negative set of multiple items based on the distance satisfying a threshold distance; associating, with at least one processor, the at least one negative image with the user identifier of the user; and training, with at least one processor, the neural network based on the at least one negative image associated with the user identifier of the user.

Clause 4. The computer-implemented method of any of clauses 1-3, wherein the first branch of the neural network includes a first fully-connected layer with first weights, wherein the second branch of the neural network includes a second fully-connected layer with second weights, and wherein the concatenated embedding is processed with a third fully-connected layer of the neural network with third weights to produce the joint embedding.

Clause 5. The computer implemented method of any of clauses 1-4, further comprising: adjusting, with at least one processor, the first weights, the second weights, and the third weights, based on back propagation using a loss function applied to the user preference score for the set of multiple items.

Clause 6. The computer-implemented method of any of clauses 1-5, further comprising: generating, with at least one processor, a plurality of user preference scores for a plurality of sets of multiple items; ranking, with at least one processor, the plurality of sets of multiple items based on the plurality of user preference scores for the plurality of sets of multiple items; determining, with at least one processor, one or more sets of multiple items of the plurality of sets of multiple items that satisfy a threshold ranking; and providing, with at least one processor, information associated with the one or more sets of multiple items to a user device of the user.

Clause 7. The computer-implemented method of any of clauses 1-6, further comprising: processing, with at least one processor, the image data associated with the single image with at least one convolutional neural network to produce a feature vector for the single image, wherein the feature vector is processed with the first branch of the neural network to produce the image embedding.

Clause 8. The computer-implemented method of any of clauses 1-7, further comprising: encoding, with at least one processor, the user identifier into a one-hot encoding vector in which an index of the vector associated with the user is 1 and a remainder of the index values is 0, wherein the one-hot encoding vector is processed with the second branch of the neural network to produce the user embedding.

Clause 9. The computer-implemented method of any of clauses 1-8, wherein the single image includes a plurality of elements of a matrix, wherein the plurality of elements of the matrix includes the image data associated with the single image, and wherein the matrix includes a number of elements that is greater than a number of items in the set of multiple items.

Clause 10. The computer-implemented method of any of clauses 1-9, wherein the set of multiple items includes at least one of the following: at least one clothing item, at least one furniture item, at least one landscaping item, at least one graphical user interface item, at least one architectural item, at least one artwork item, or any combination thereof.

Clause 11. A system for predicting user preference of items in an image, comprising: at least one processor programmed and/or configured to: process image data associated with a single image with a first branch of a neural network to produce an image embedding, wherein the single image includes a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple items from the neural network based on the joint embedding, wherein the user preference score includes a prediction of whether the user prefers the set of multiple items.

Clause 12. The system of clause 11, wherein the at least one processor is further programmed and/or configured to: web crawl at least one web site to retrieve a plurality of positive images associated with the user, wherein each of the plurality of positive images includes a positive set of multiple items; associate the plurality of positive images with the user identifier of the user; and train the neural network based on the plurality of positive images associated with the user identifier of the user.

Clause 13. The system of clauses 11 or 12, wherein the at least one processor is further programmed and/or configured to: receive at least one other image, wherein the at least one other image includes another set of multiple items, and wherein the at least one other image is not associated with the user; determine a distance between the at least one other image and at least one positive image of the plurality of positive images associated with the user; determine the at least one other image as at least one negative image including a negative set of multiple items based on the distance satisfying a threshold distance; associate the at least one negative image with the user identifier of the user; and train the neural network based on the at least one negative image associated with the user identifier of the user.

Clause 14. The system of any of clauses 11-13, wherein the first branch of the neural network includes a first fully-connected layer with first weights, wherein the second branch of the neural network includes a second fully-connected layer with second weights, wherein the concatenated embedding is processed with a third fully-connected layer of the neural network with third weights to produce the joint embedding, and wherein the at least one processor is further programmed and/or configured to: adjust the first weights, the second weights, and the third weights, based on back propagation using a loss function applied to the user preference score for the set of multiple items.

Clause 15. The system of any of clauses 11-14, wherein the at least one processor is further programmed and/or configured to: generate a plurality of user preference scores for a plurality of sets of multiple items; rank the plurality of sets of multiple items based on the plurality of user preference scores for the plurality of sets of multiple items; determine one or more sets of multiple items of the plurality of sets of multiple items that satisfy a threshold ranking; and provide information associated with the one or more sets of multiple items to a user device of the user.

Clause 16. The system of any of clauses 11-15, wherein the at least one processor is further programmed and/or configured to: process the image data associated with the single image with at least one convolutional neural network to produce a feature vector for the single image, wherein the feature vector is processed with the first branch of the neural network to produce the image embedding.

Clause 17. The system of any of clauses 11-16, wherein the at least one processor is further programmed and/or configured to: encode the user identifier into a one-hot encoding vector in which an index of the vector associated with the user is 1 and a remainder of the index values is 0, wherein the one-hot encoding vector is processed with the second branch of the neural network to produce the user embedding.

Clause 18. The system of any of clauses 11-17, wherein the single image includes a plurality of elements of a matrix, wherein the plurality of elements of the matrix includes the image data associated with the single image, and wherein the matrix includes a number of elements that is greater than a number of items in the set of multiple items.

Clause 19. The system of any of clauses 11-18, wherein the set of multiple items includes at least one of the following: at least one clothing item, at least one furniture item, at least one landscaping item, at least one graphical user interface item, at least one architectural item, at least one artwork item, or any combination thereof.

Clause 20. A computer program product including at least one non-transitory computer-readable medium including one or more instructions that, when executed by at least one processor, cause the at least one processor to: process image data associated with a single image with a first branch of a neural network to produce an image embedding, wherein the single image includes a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple items from the neural network based on the joint embedding, wherein the user preference score includes a prediction of whether the user prefers the set of multiple items.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
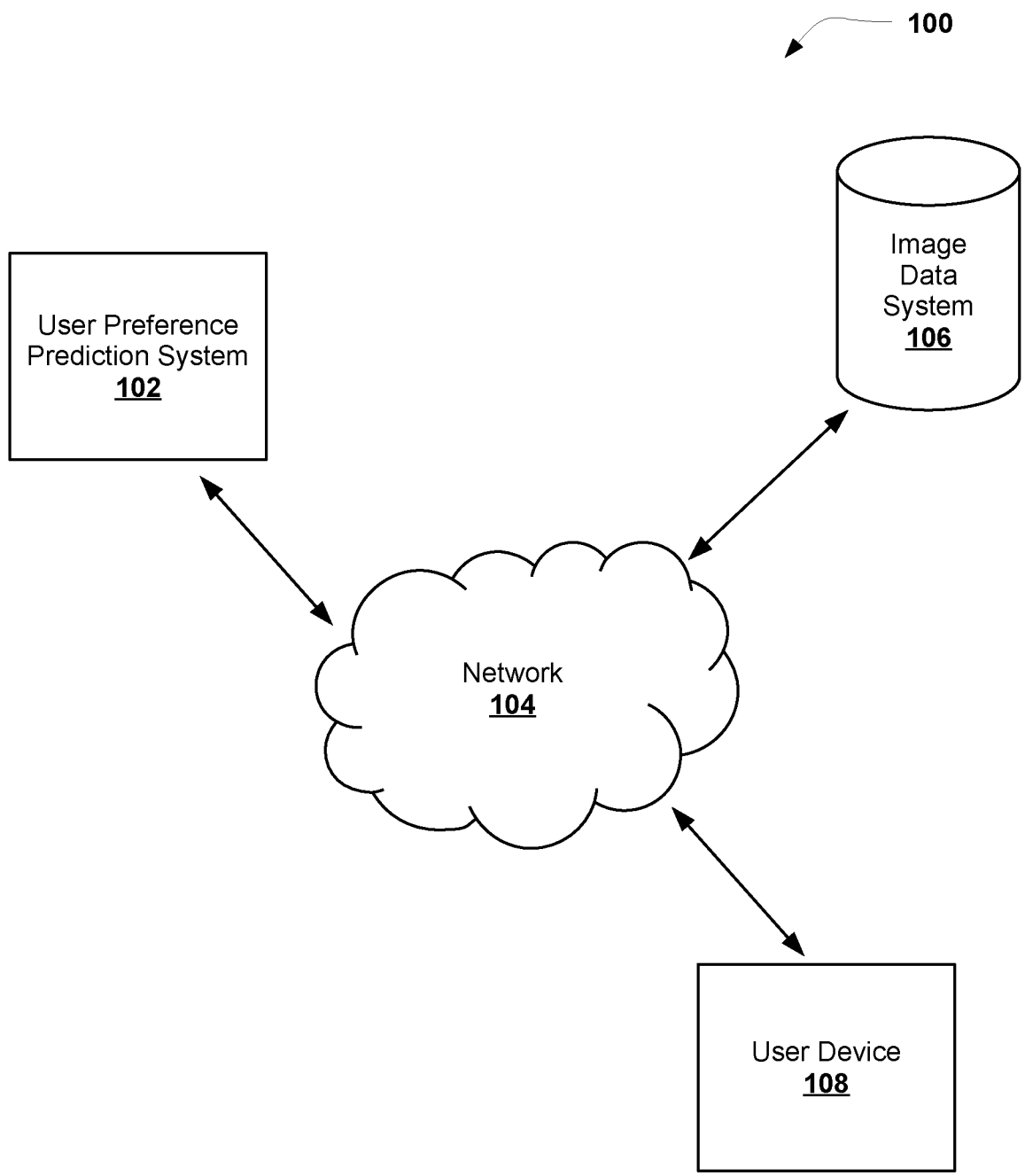
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Some existing fashion recommendation systems and methods use keyword search, purchase histories, and user ratings to recommend items to individuals. However, these existing systems and methods do not consider the visual appearance of items, which is a relevant feature in a visual domain, such as fashion, and/or the like. To address this issue, some existing fashion recommendation systems and methods have focused on developing content-based methods. For example, some existing fashion recommendation systems and methods use a deep neural network that combines implicit feedback from users with visual content to model fashion tastes of individuals and recommend individual items that maximize a preference score of an individual. However, an individual may be more interested in a set of items (e.g., an entire outfit, etc.) including multiple items that meet the personal tastes of the individual. As an example, recommendation of sets of items (e.g., personalized fashion outfits, etc.) may be more complex than recommendation of single items (e.g., individual clothing items, etc.). However, existing fashion recommendation systems and methods use category labels of an item to determine a preference of a user for the item, separately process multiple images of multiple items to determine the preference of the user for the multiple items, and randomly select images of items to create a negative class of items that the user does not prefer (e.g., dislikes, etc.).

Provided are improved systems, devices, products, apparatus, and/or methods for predicting user preference of items in an image.

Non-limiting embodiments or aspects of the present disclosure are directed to systems, methods, and computer program products that process image data associated with a single image with a first branch of a neural network to produce an image embedding, the single image including a set of multiple items; process a user identifier of a user with a second branch of the neural network to produce a user embedding; concatenate the image embedding with the user embedding to produce a concatenated embedding; process the concatenated embedding with the neural network to produce a joint embedding; and generate a user preference score for the set of multiple items from the neural network based on the joint embedding, the user preference score including a prediction of whether the user prefers the set of multiple items. In this way, non-limiting embodiments or aspects of the present disclosure may provide for predicting user preference of items in an image that provide several technical advantages over existing user preference prediction systems and methods by enabling predicting a user preference of items in an image without using category labels to determine the user preference for the items; processing a single image including a set of multiple items to determine a user preference for the set of multiple items in the single image, which may eliminate a need to carefully detect and segment each individual item in the set of multiple items in the image; and determining a negative class of images and/or items that a user does not prefer (e.g., dislikes, etc.) based on distances of the images and/or items from a positive class of images and/or items that a user is known to prefer (e.g., like, etc.), which may address a data sparsity issue and substantially improve model performance as compared to randomly selecting negative samples.

Referring now to FIG. 1, FIG. 1 is a diagram of an example environment 100 in which systems, devices, products, apparatus, and/or methods, described herein, may be implemented. As shown in FIG. 1, environment 100 includes user preference prediction system 102, communication network 104, image data system 106, and/or user device 108. Systems and/or devices of environment 100 may interconnect via wired connections, wireless connections, or a combination of wired and wireless connections. For example, systems and/or devices of environment 100 may interconnect and/or communicate data and/or information (e.g., image data, text data, user identifiers, user preference scores, recommendation information, etc.) via communication network 104.

User preference prediction system 102 may include one or more devices capable of predicting user preference of items in an image. For example, user preference prediction system 102 may include one or more devices capable of processing image data associated with a single image with a first branch of a neural network to produce an image embedding, the single image including a set of multiple items; processing a user identifier of a user with a second branch of the neural network to produce a user embedding; concatenating the image embedding with the user embedding to produce a concatenated embedding; processing the concatenated embedding with the neural network to produce a joint embedding; and generating a user preference score for the set of multiple items from the neural network based on the joint embedding, the user preference score including a prediction of whether the user prefers (e.g., likes, favors, enjoys, etc.) the set of multiple items.

In some non-limiting embodiments or aspects, an image includes a matrix (e.g., a grid, a rectangular array, a multi-dimensional grid, a multi-dimensional array, a set of rows and columns, etc.) that has a plurality of elements (e.g., units, cells, pixels, etc.). Each element of the matrix includes image data (e.g., a value of image data, a value of geographic location image data, a value of vehicle map data, a value of feature map data, a value of a prediction score of map, etc.) associated with the image. In some non-limiting embodiments or aspects, each element of an image is associated with three dimensions. For example, a first dimension of the element is a width of the element, a second dimension of the element is a length of the element, and a third dimensions is a value associated with the image data of the element.

Communication network 104 may include one or more wired and/or wireless networks. For example, communication network 104 can include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Image data system 106 may include one or more devices capable of storing and/or providing image data associated with images including items. For example, image data system 106 may provide or make available one or more websites and/or one or more databases from which images of items are available for retrieval, and user preference prediction system 102 can web crawl the one or more websites and/or query the one or more databases to retrieve the images to create a dataset of image data. As an example, one or more of the images may be associated with one or more users (e.g., one or more of the images may include an indication that the one or more users likes a set of multiple items in the one or more images, etc.). In such an example, image data system 106 may include a fashion website (e.g., Polyvore, etc.) from which images of fashion outfits that include multiple clothing items (e.g., a shirt, a skirt, a hat, a purse, etc.) are available, and a fashion outfit may be associated with a user that has indicated that the user likes or prefers the fashion outfit to the fashion website. However, non-limiting embodiments or aspects are not limited thereto, and an item or items in an image may include any type of item, such as a clothing item, a furniture item (e.g., a chair, a desk, a lamp, etc.), a landscaping item (e.g., a bush, a tree, a flower, etc.), a graphical user interface item (e.g., text, a link, an image, a background, etc.), an architectural item (e.g., a building, a column, a window, etc.), an artwork item (e.g., a painting, a sculpture, etc.), and/or the like.

User device 108 may include a client device and/or the like. For example, user device 108 can be associated with a user. In some non-limiting embodiments or aspects, user device 108 can receive information associated with one or more sets of multiple items from user preference prediction system 102 and/or image data system 106. As an example, user preference prediction system 102 can generate, for a user of user device 108, a plurality of user preference scores for a plurality of sets of multiple items, rank the plurality of sets of multiple items based on the plurality of user preference scores for the plurality of sets of multiple items, determine one or more sets of multiple items of the plurality of sets of multiple items that satisfy a threshold ranking, and provide the information associated with the one or more sets of multiple items to user device 108 of the user (e.g., recommendation information including one or more sets of items recommended to the user according to the user preference scores of the user associated with one or more images of the one or more sets of items, etc.).

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
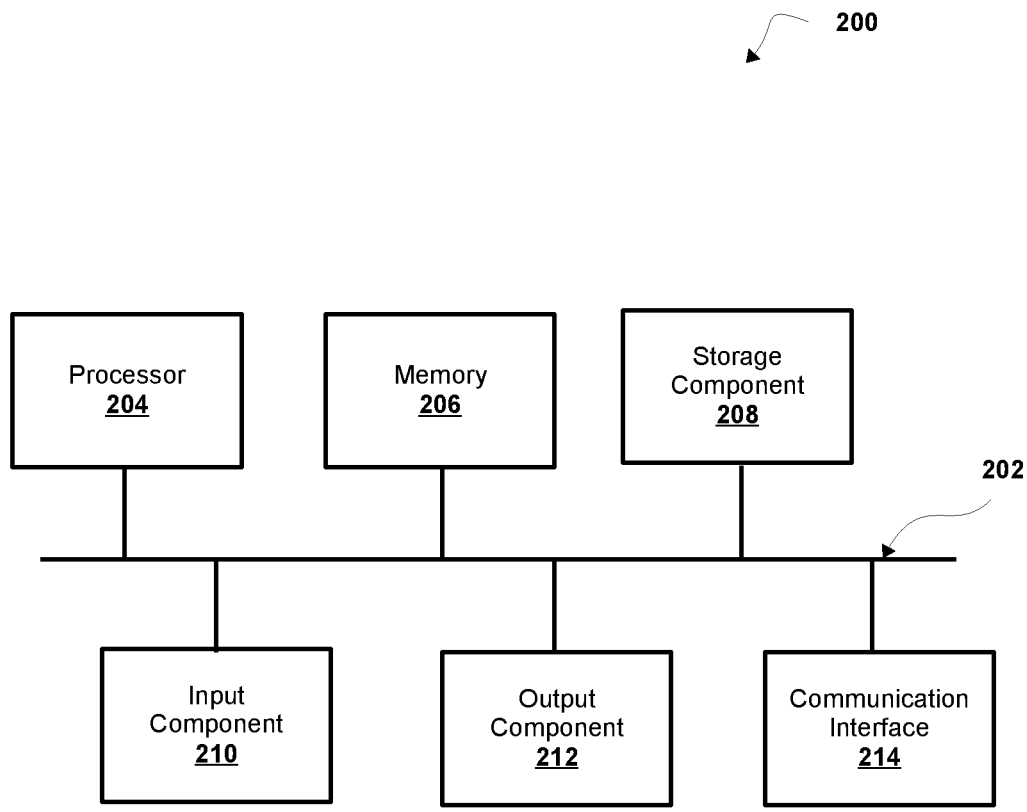
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of user preference prediction system 102, one or more devices of image data system 106, and/or user device 108 (e.g., one or more devices of a system of user device 108, etc.). In some non-limiting embodiments or aspects, one or more devices of user preference prediction system 102, one or more devices of image data system 106, and/or user device 108 (e.g., one or more devices of a system of user device 108, etc.) may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
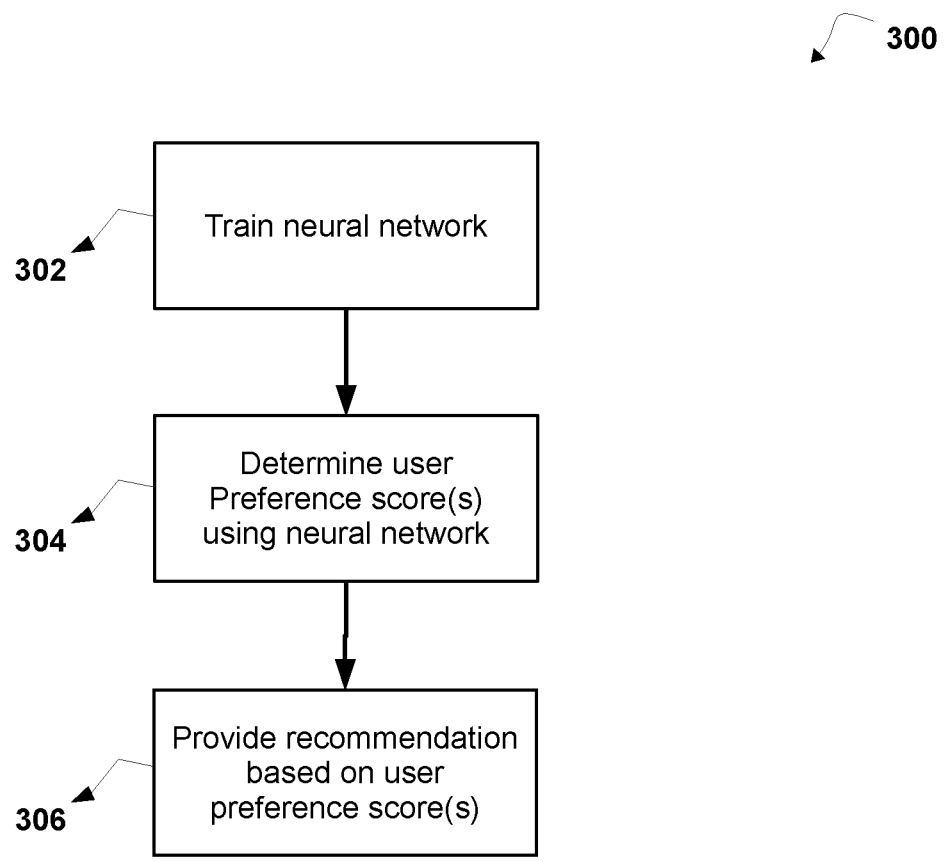
FIG. 3 is a flowchart of non-limiting embodiments or aspects of a process for predicting user preference of items in an image.

Referring now to FIG. 3, FIG. 3 is a flowchart of non-limiting embodiments or aspects of a process 300 for predicting user preference of items in an image. In some non-limiting embodiments or aspects, one or more of the steps of process 300 may be performed (e.g., completely, partially, etc.) by user preference prediction system 102 (e.g., one or more devices of user preference prediction system 102, etc.). In some non-limiting embodiments or aspects, one or more of the steps of process 300 may be performed (e.g., completely, partially, etc.) by another device or a group of devices separate from or including user preference prediction system 102, such as image data system 106 (e.g., one or more devices of image data system 106), and/or user device 108 (e.g., one or more devices of a system of user device 108, etc.).

Figure 6:
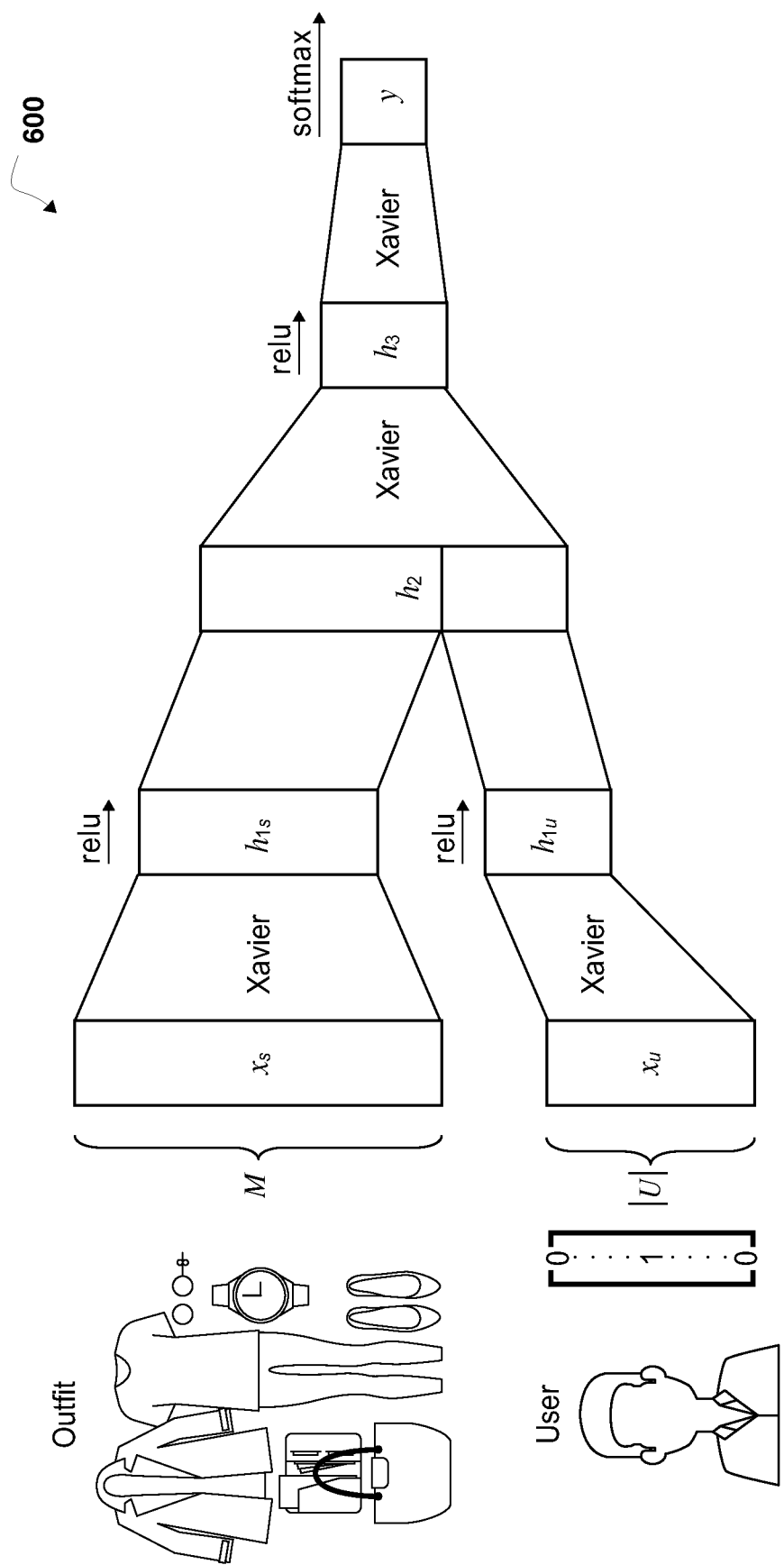
FIG. 6 is a diagram of non-limiting embodiments or aspects of a neural network model for predicting user preference of items in an image.

As shown in FIG. 3, at step 302, process 300 includes training a neural network. For example, user preference prediction system 102 may train a neural network. As an example, user preference prediction system 102 may train a neural network (e.g., a neural network as shown in FIG. 6, etc.) based on a plurality of positive images (e.g., positive samples, etc.) associated with a user identifier of a user and at least one negative image (e.g., negative sample, etc.) associated with the user identifier of the user. Further details regarding non-limiting embodiments or aspects of step 302 of process 300 are provided below with regard to FIG. 4.

Figure 4:
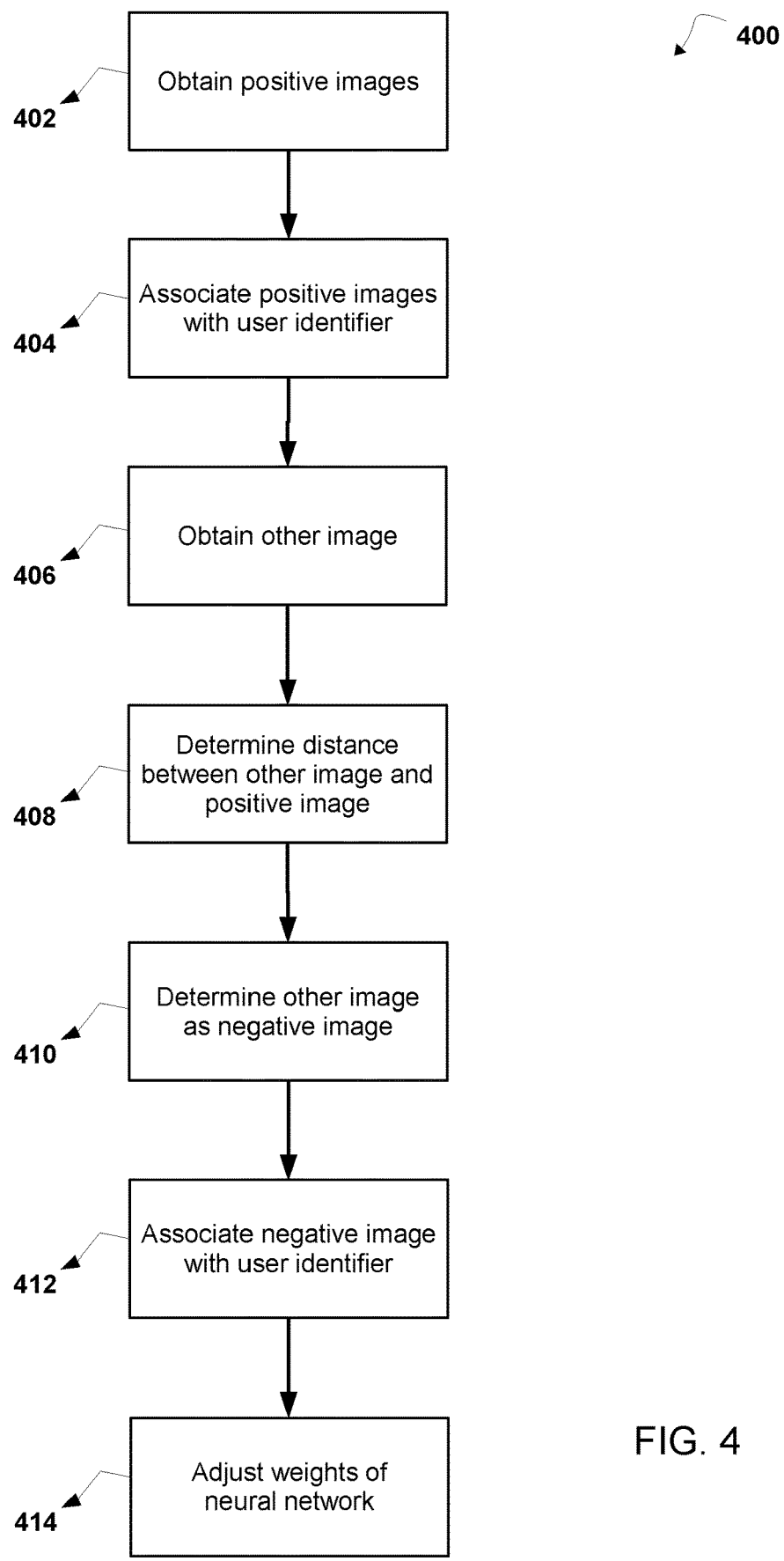
FIG. 4 is a flowchart of non-limiting embodiments or aspects of a process for predicting user preference of items in an image.

Referring now to FIG. 4, FIG. 4 is a flowchart of a process 400 for predicting user preference of items in an image. In some non-limiting embodiments or aspects, one or more of the steps of process 400 may be performed (e.g., completely, partially, etc.) by user preference prediction system 102 (e.g., one or more devices of user preference prediction system 102, etc.). In some non-limiting embodiments or aspects, one or more of the steps of process 400 may be performed (e.g., completely, partially, etc.) by another device or a group of devices separate from or including user preference prediction system 102, such as image data system 106 (e.g., one or more devices of image data system 106), and/or user device 108 (e.g., one or more devices of a system of user device 108, etc.).

As shown in FIG. 4, at step 402, process 400 may include obtaining positive images. For example, user preference prediction system 102 may obtain positive images. As an example, user preference prediction system 102 may obtain a plurality of positive images associated with a user. In such an example, each of the plurality of positive images may include a positive set of multiple items.

In some non-limiting embodiments or aspects, user preference prediction system 102 may web crawl at least one web site (e.g., Polyvore, etc.) to retrieve the plurality of positive images associated with the user. For example, Polyvore is a fashion social network that allows users to create fashion outfits from different items and/or to like and save outfits created by other users. As an example, user preference prediction system 102 may web crawl profiles of a predetermined and/or desired number of users to create a dataset including a plurality of positive sets of multiple items (e.g., a plurality of fashion outfits each including a plurality of fashion items, etc.). In such an example, each of the plurality of positive images may include a positive set of multiple items of the plurality of positive sets of multiple items.

As shown in FIG. 4, at step 404, process 400 may include associating positive images with a user identifier. For example, user preference prediction system 102 may associate positive images with a user identifier. As an example, user preference prediction system 102 may associate the plurality of positive images with the user identifier of the user. In such an example, the plurality of positive images may include a positive class (e.g., sets of items, such as outfits, and/or the like, that the user has preferred or liked, etc.)

In some non-limiting embodiments or aspects, a plurality of positive images (e.g., a positive class, etc.) may be defined as $D_{pos}=<u, o_i>$, where $D_{pos}$ is a dataset including the plurality of positive sets of multiple items in the plurality of positive images, and each $<u, o_i>$ is a positive sample of a user liked or preferred set of items (e.g., a user liked or preferred outfit, etc.).

As shown in FIG. 4, at step 406, process 400 may include obtaining at least one other image. For example, user preference prediction system 102 may obtain at least one other image. As an example, user preference prediction system 102 may receive at least one other image, the at least one other image including another set of multiple items (e.g., another set of multiple items different than each set of multiple items of the positive class, etc.). In such an example, the at least one other image may not be associated with the user.

An existing process for selecting negative samples for a dataset $D_{pos}$ of positive samples may include, for each $<u, o_i> \in D_{pos}$, randomly selecting another set of multiple items where $<u, o_j> \in D_{pos}$. However, a user u having never liked or preferred a set of multiple items $o_j$ does not necessarily mean that the user u may not like that set of multiple items $o_j$ in the future.

As shown in FIG. 4, at step 408, process 400 may include determining a distance between at least one other image and a positive image. For example, user preference prediction system 102 may determine a distance between at least one other image and a positive image. As an example, user preference prediction system 102 may determine a distance between the at least one other image and at least one positive image of the plurality of positive images associated with the user. For example, given $<u, o_i> \in D_{pos}$, in a space of item features, user preference prediction system 102 may randomly pick at least one other set of multiple items $o_j$ and use a distance measurement (e.g., cosine distance, etc.) to measure the distance $d(o_i, o_j)$ of the other set of multiple items $o_j$ to a set of multiple items $o_i$ in the positive sample.

As shown in FIG. 4, at step 410, process 400 may include determining at least one other image as a negative image. For example, user preference prediction system 102 may determine at least one other image as a negative image. As an example, user preference prediction system 102 may determine the at least one other image as at least one negative image including a negative set of multiple items based on the distance satisfying a threshold distance λ. For example, user preference prediction system 102 may select negative samples that are at least λ-different (e.g., within a 75th quantile, etc.) from a positive sample. As an example, if $d(o_i, o_j)<\lambda$, user preference prediction system 102 may re-select another sample (e.g., select a new or different potential negative sample, etc.) and re-check the distance of the another sample to the positive sample, $d(o_i, o_j)$. If $d(o_i, o_j) \geq \lambda$, user preference prediction system 102 may add $<u, o_j>$ to a dataset $D_{neg}$ including a negative sample or negative sets of multiple items. For example, the at least one other image may include a negative class (e.g., at least one set of items, such as at least one outfit, and/or the like, that the user has not preferred or liked, etc.).

As shown in FIG. 4, at step 412, process 400 may include associating a negative image with a user identifier. For example, user preference prediction system 102 may associate a negative image with a user identifier. As an example, user preference prediction system 102 may associate the at least one negative image (e.g., the negative class, etc.) with the user identifier of the user. In such an example, user preference prediction system 102 may repeat steps 406-412 for all $<u, o> \in D_{pos}$ until $|D_{pos}|=|D_{neg}|$.

As shown in FIG. 4, at step 414, process 400 may include adjusting weights of a neural network. For example, user preference prediction system 102 may adjust weights of a neural network. As an example, user preference prediction system 102 may adjust weights of the neural network based on back propagation using a loss function applied to a user preference score generated by the neural network for a set of multiple items. In such an example, user preference prediction system 102 may train the neural network using back propagation with a loss function applied to a user preference score generated by the neural network for a set of multiple items from the plurality of positive images (e.g., positive samples, etc.) associated with the user identifier of the user and/or the at least one negative image (e.g., negative sample, etc.) associated with the user identifier of the user.

In some non-limiting embodiments or aspects, a neural network may include a first branch including a first fully-connected layer with first weights, a second branch including a second fully-connected layer with second weights, and a third fully-connected layer of the neural network with third weights (e.g., for producing a joint embedding, etc.). For example, user preference prediction system 102 may adjust the first weights, the second weights, and the third weights, based on back propagation using a loss function applied to a user preference score generated by the neural network for a set of multiple items. As an example, a neural network and a loss function according to non-limiting embodiments or aspects are described in more detail herein below with respect to FIGS. 5 and 6.

Referring again to FIG. 3, at step 304, process 300 includes determining a user preference score using a neural network. For example, user preference prediction system 102 may determine a user preference score using a neural network. As an example, user preference prediction system 102 may determine the user preference score using the trained neural network. In such an example, for all sets of multiple items O (e.g., for all fashion outfits, etc.), and for all users U, given a set of multiple items o and a user u, user preference prediction system 102 may determine whether the user u likes or prefers the set of items o (e.g., determine the user preference score of the user u for the set of items o, etc.). Further details regarding non-limiting embodiments or aspects of step 304 of process 300 are provided below with regard to FIG. 5.

Figure 5:
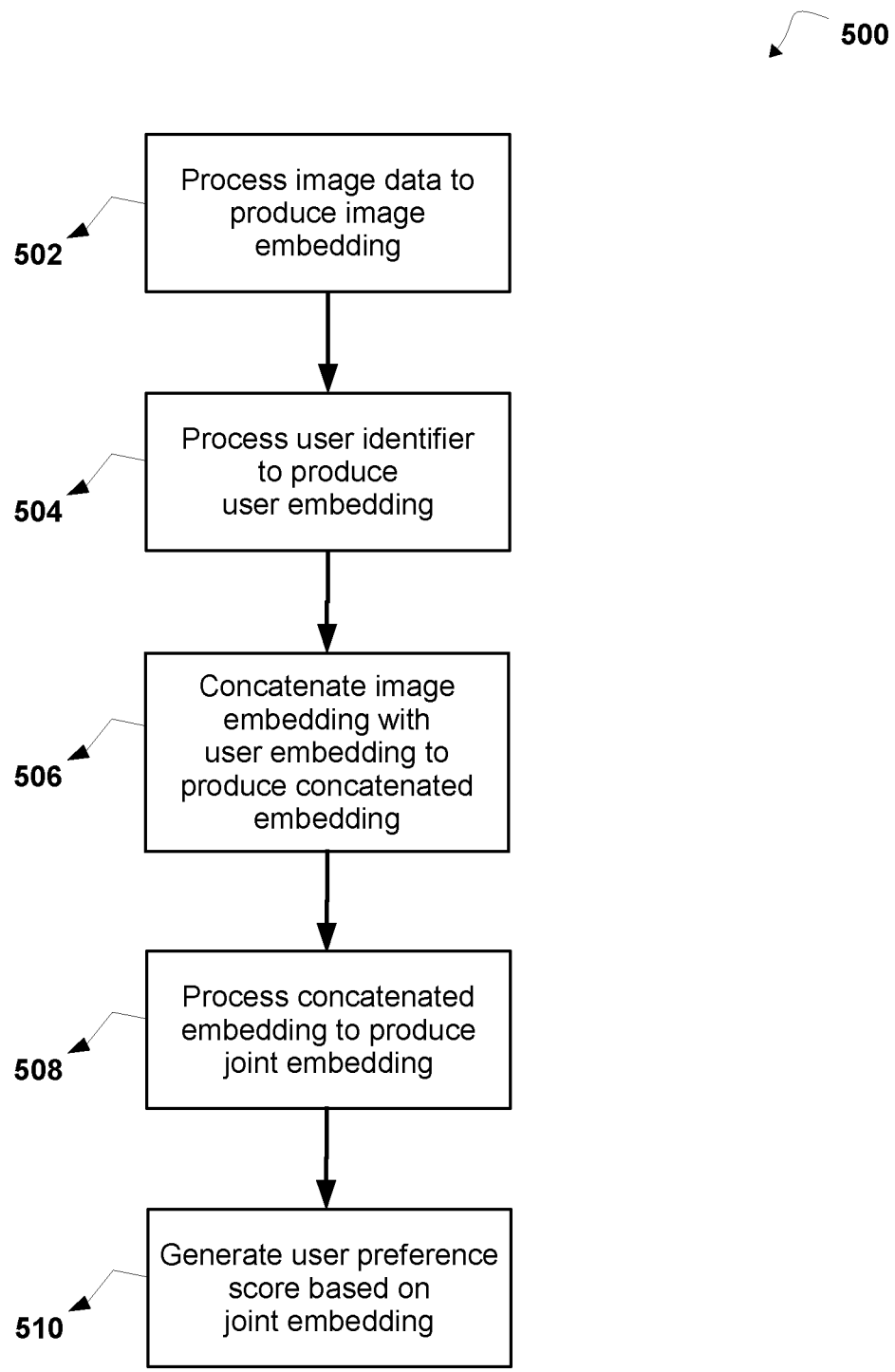
FIG. 5 is a flowchart of non-limiting embodiments or aspects of a process for predicting user preference of items in an image.

Referring now to FIG. 5, FIG. 5 is a flowchart of a process 500 for predicting user preference of items in an image. In some non-limiting embodiments or aspects, one or more of the steps of process 500 may be performed (e.g., completely, partially, etc.) by user preference prediction system 102 (e.g., one or more devices of user preference prediction system 102, etc.). In some non-limiting embodiments or aspects, one or more of the steps of process 500 may be performed (e.g., completely, partially, etc.) by another device or a group of devices separate from or including user preference prediction system 102, such as image data system 106 (e.g., one or more devices of image data system 106), and/or user device 108 (e.g., one or more devices of a system of user device 108, etc.).

As shown in FIG. 5, at step 502, process 500 may include processing image data to produce an image embedding. For example, user preference prediction system 102 may process image data to produce an image embedding. As an example, user preference prediction system 102 may process image data associated with a single image with a first branch of a neural network (e.g., the trained neural network, etc.) to produce an image embedding. In such an example, the single image may include a set of multiple items.

In some non-limiting embodiments or aspects, the single image includes a plurality of elements of a matrix, wherein the plurality of elements of the matrix includes the image data associated with the single image, and wherein the matrix includes a number of elements that is greater than a number of items in the set of multiple items. In some non-limiting embodiments or aspects, a set of multiple items included in the image includes at least one of the following: at least one clothing item, at least one furniture item, at least one landscaping item, at least one graphical user interface item, at least one architectural item, at least one artwork item, or any combination thereof. For example, a set of multiple items may include a fashion outfit including a plurality of clothing items, and/or the like.

Referring also to FIG. 6, FIG. 6 is a diagram of an implementation 600 of a neural network according to non-limiting embodiments or aspects of the present disclosure. As shown in FIG. 6, a first branch of the neural network (e.g., the upper branch in FIG. 6) may receive as an input the single image including a set of multiple items o.

In some non-limiting embodiments or aspects, image data associated with a single image may be processed with at least one convolutional neural network (CNN) to produce a feature vector for the single image. For example, the single image including the set of multiple items o may be passed to a CNN network (e.g., a DenseNet, etc.) to generate a feature vector representation of dimension M, which is denoted as $x_s$ in FIG. 6. As an example, the feature vector $x_s$ may be processed with the first branch of the neural network to produce the image embedding, where the feature vector $x_s$ may be passed through a fully-connected layer with weights $W_{1s}$ to produce a lower-dimensional representation $h_{1s}$ (e.g., the image embedding, etc.). In such an example, the fully connected layer may have a predetermined size (e.g., 256, etc.) and the weights $W_{1s}$ may be initialized with Xavier.

Referring again to FIG. 5, at step 504, process 500 may include processing a user identifier to produce a user embedding. For example, user preference prediction system 102 may process a user identifier to produce a user embedding. As an example, user preference prediction system 102 may process a user identifier of a user with a second branch of the neural network to produce a user embedding.

In some non-limiting embodiments or aspects, a user identifier is encoded into a one-hot encoding vector in which an index of the vector associated with the user is 1 and a remainder of the index values is 0 (e.g., a one-hot encoding vector with dimension |U| as $x_u$). For example, as shown in FIG. 6, the user identifier u may be encoded into a one-hot encoding vector with dimension IQ as $x_u$. As an example, the one-hot encoding vector $x_u$ may be processed with the second branch of the neural network to produce the user embedding, where the one-hot encoding vector $x_u$ may be passed through a fully-connected layer with weights $W_{1u}$ to produce a lower-dimensional representation $h_{1u}$ (e.g., the user embedding, etc.). In such an example, the fully connected layer may have a predetermined size (e.g., 16, etc.) and the weights $W_{1u}$ may be initialized with Xavier.

As shown in FIG. 5, at step 506, process 500 may include concatenating an image embedding with a user embedding to produce a concatenated embedding. For example, user preference prediction system 102 may concatenate an image embedding with a user embedding to produce a concatenated embedding. As an example, and referring also to FIG. 6, user preference prediction system 102 may concatenate the image embedding $h_{1s}$ with the user embedding $h_{1u}$ to produce a concatenated embedding $h_2$.

As shown in FIG. 5, at step 508, process 500 includes processing a concatenated embedding to produce a joint embedding. For example, user preference prediction system 102 may process a concatenated embedding to produce a joint embedding. As an example, and referring also to FIG. 6, user preference prediction system 102 may process the concatenated embedding $h_2$ to produce a joint embedding $h_3$. As an example, the concatenated embedding $h_2$ may be passed through another fully-connected layer with weights $W_{23}$ to produce the joint embedding $h_3$. In such an example, the fully connected layer may have a predetermined size (e.g., 16, etc.) and the weights $W_{23}$ may be initialized with Xavier.

As shown in FIG. 5, at step 510, process 500 may include generating a user preference score. For example, user preference prediction system 102 may generate a user preference score. As an example, user preference prediction system 102 may generate a user preference score for the set of multiple items from the neural network based on the joint embedding, and the user preference score may include a prediction of whether the user prefers the set of multiple items. In such an example, and referring again to FIG. 6, the joint embedding $h_3$ may be passed through a further fully connected layer with weights $W_{3y}$, and the output of this fully connected layer may be input to a softmax layer. For example, the softmax layer may generate a user preference score $\hat{y}$ between 0 and 1. As an example, a user preference score of 0 may indicate that the user u does not like or prefer the set of items o, and a user preference score of 1 may indicate that the user u likes or prefers the set of items o. As shown in FIG. 6, a neural network model according to non-limiting embodiments or aspects may include a binary classifier, and activation functions that include a rectified linear unit (ReLU). In such an example, a user preference score $\hat{y}$ may be represented according to the following Equations (1) and (2):

$$\hat{y} = \text{softmax}(\text{relu}([\text{relu}(x_s \cdot W_{1s}) \| \text{relu}(x_u \cdot W_{1u})] \cdot W_{23}) \cdot W_{3y}) \quad (1)$$

$$\hat{y} = \text{softmax}(h_3 \cdot W_{3y}) \quad (2)$$

where softmax represents a softmax layer, wherein relu represents an activation function including a rectified linear unit, where $x_s$ represents a feature vector representation of dimension M, where $W_{1s}$ represents weights of a fully-connected layer that produces a lower-dimensional representation $h_{1s}$ (e.g., an image embedding, etc.), where $\|$ represents a vector concatenation, where $x_u$ represents a one-hot encoding vector with dimension $|U|$, where $W_{1u}$ represents weights of a fully-connected layer that produces a lower-dimensional representation $h_{is}$ (e.g., a user embedding, etc.), where $W_{23}$ represents weights of a fully-connected layer that produces a joint embedding $h_3$, and where $W_{3y}$ represents weights of fully connected layer an output of which is input to the softmax layer.

In some non-limiting embodiments or aspects, a loss function of the neural network model may be defined according to the following Equation (3):

$$\mathcal{L}(\Theta) = \sum_{i}^{N} (\hat{y}_i - y_i)^2 \quad (3)$$

where $\theta = \{W_{s1}, W_{u1}, W_{23}, W_{3y}\}$ is a set of model parameters or weights of the neural network model, and N is a number of instances to learn. For an example, an objective of the neural network model may be to minimize the loss function.

As shown in FIG. 3, at step 306, process 300 includes providing a recommendation based on a user preference score. For example, user preference prediction system 102 may provide a recommendation based on a user preference score. As an example, user preference prediction system 102 may provide a recommendation based on the user preference score determined using the trained neural network. Further details regarding non-limiting embodiments or aspects of step 306 of process 300 are provided below with regard to FIG. 7.

Figure 7:
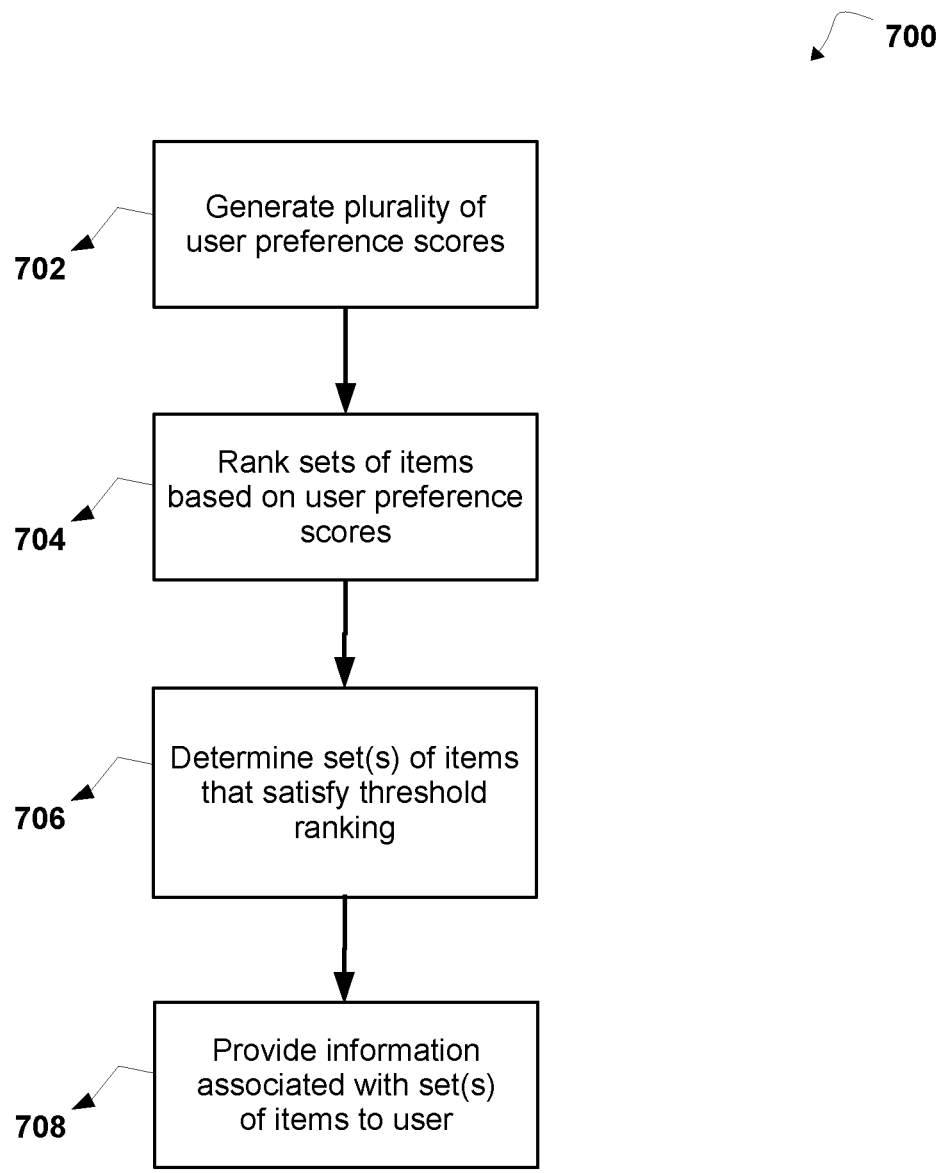
FIG. 7 is a flowchart of non-limiting embodiments or aspects of a process for predicting user preference of items in an image.

Referring now to FIG. 7, FIG. 7 is a flowchart of a process 700 for predicting user preference of items in an image. In some non-limiting embodiments or aspects, one or more of the steps of process 700 may be performed (e.g., completely, partially, etc.) by user preference prediction system 102 (e.g., one or more devices of user preference prediction system 102, etc.). In some non-limiting embodiments or aspects, one or more of the steps of process 500 may be performed (e.g., completely, partially, etc.) by another device or a group of devices separate from or including user preference prediction system 102, such as image data system 106 (e.g., one or more devices of image data system 106), and/or user device 108 (e.g., one or more devices of a system of user device 108, etc.).

As shown in FIG. 7, at step 702, process 700 includes generating a plurality of user preference scores. For example, user preference prediction system 102 may generate a plurality of user preference scores. As an example, user preference prediction system 102 may generate a plurality of user preference scores for a plurality of sets of multiple items.

As shown in FIG. 7, at step 704, process 700 includes ranking sets of items based on user preference scores. For example, user preference prediction system 102 may rank sets of items based on user preference scores. As an example, user preference prediction system 102 may rank the plurality of sets of multiple items based on the plurality of user preference scores for the plurality of sets of multiple items.

As shown in FIG. 7, at step 706, process 700 includes determining one or more sets of items that satisfy a threshold ranking. For example, user preference prediction system 102 may determine one or more sets of items that satisfy a threshold ranking. As an example, user preference prediction system 102 may determine one or more sets of multiple items of the plurality of sets of multiple items that satisfy a threshold ranking.

As shown in FIG. 7, at step 708, process 700 includes providing information associated with one or more sets of items to a user. For example, user preference prediction system 102 may provide information associated with one or more sets of items to a user. As an example, user preference prediction system 102 may provide information associated with the one or more sets of multiple items to a user device of the user. In such an example, the information may include images of the one or more sets of multiple items, an offer to purchase the one or more sets of multiple items, and/or the like.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for predicting user preference of items in an image, comprising:
    processing, with at least one processor, image data associated with a single image with a first branch of a neural network to produce an image embedding, wherein the single image includes a set of multiple items;
    processing, with at least one processor, a user identifier of a user with a second branch of the neural network to produce a user embedding;
    concatenating, with at least one processor, the image embedding with the user embedding to produce a concatenated embedding;
    processing, with at least one processor, the concatenated embedding with the neural network to produce a joint embedding; and
    generating, with at least one processor, a user preference score for the set of multiple items from the neural network based on the joint embedding, wherein the user preference score includes a prediction of whether the user prefers the set of multiple items.

2. The computer-implemented method of claim 1, further comprising:
    web crawling, with at least one processor, at least one web site to retrieve a plurality of positive images associated with the user, wherein each of the plurality of positive images includes a positive set of multiple items;

associating, with at least one processor, the plurality of
positive images with the user identifier of the user; and
training, with at least one processor, the neural network
based on the plurality of positive images associated
with the user identifier of the user.

3. The computer-implemented method of claim 2, further comprising:
receiving, with at least one processor, at least one other image, wherein the at least one other image includes another set of multiple items, and wherein the at least one other image is not associated with the user;
determining, with at least one processor, a distance between the at least one other image and at least one positive image of the plurality of positive images associated with the user;
determining, with at least one processor, the at least one other image as at least one negative image including a negative set of multiple items based on the distance satisfying a threshold distance;
associating, with at least one processor, the at least one negative image with the user identifier of the user; and
training, with at least one processor, the neural network based on the at least one negative image associated with the user identifier of the user.

4. The computer-implemented method of claim 3, wherein the first branch of the neural network includes a first fully-connected layer with first weights, wherein the second branch of the neural network includes a second fully-connected layer with second weights, and wherein the concatenated embedding is processed with a third fully-connected layer of the neural network with third weights to produce the joint embedding.

5. The computer implemented method of claim 4, further comprising:
adjusting, with at least one processor, the first weights, the second weights, and the third weights, based on back propagation using a loss function applied to the user preference score for the set of multiple items.

6. The computer-implemented method of claim 1, further comprising:
generating, with at least one processor, a plurality of user preference scores for a plurality of sets of multiple items;
ranking, with at least one processor, the plurality of sets of multiple items based on the plurality of user preference scores for the plurality of sets of multiple items;
determining, with at least one processor, one or more sets of multiple items of the plurality of sets of multiple items that satisfy a threshold ranking; and
providing, with at least one processor, information associated with the one or more sets of multiple items to a user device of the user.

7. The computer-implemented method of claim 1, further comprising:
processing, with at least one processor, the image data associated with the single image with at least one convolutional neural network to produce a feature vector for the single image, wherein the feature vector is processed with the first branch of the neural network to produce the image embedding.

8. The computer-implemented method of claim 1, further comprising:
encoding, with at least one processor, the user identifier into a one-hot encoding vector in which an index of the vector associated with the user is 1 and a remainder of the index values is 0, wherein the one-hot encoding vector is processed with the second branch of the neural network to produce the user embedding.

9. The computer-implemented method of claim 1, wherein the single image includes a plurality of elements of a matrix, wherein the plurality of elements of the matrix includes the image data associated with the single image, and wherein the matrix includes a number of elements that is greater than a number of items in the set of multiple items.

10. The computer-implemented method of claim 1, wherein the set of multiple items includes at least one of the following: at least one clothing item, at least one furniture item, at least one landscaping item, at least one graphical user interface item, at least one architectural item, at least one artwork item, or any combination thereof.

11. A system for predicting user preference of items in an image, comprising:
at least one processor programmed and/or configured to:
process image data associated with a single image with a first branch of a neural network to produce an image embedding, wherein the single image includes a set of multiple items;
process a user identifier of a user with a second branch of the neural network to produce a user embedding;
concatenate the image embedding with the user embedding to produce a concatenated embedding;
process the concatenated embedding with the neural network to produce a joint embedding; and
generate a user preference score for the set of multiple items from the neural network based on the joint embedding, wherein the user preference score includes a prediction of whether the user prefers the set of multiple items.

12. The system of claim 11, wherein the at least one processor is further programmed and/or configured to:
web crawl at least one web site to retrieve a plurality of positive images associated with the user, wherein each of the plurality of positive images includes a positive set of multiple items;
associate the plurality of positive images with the user identifier of the user; and
train the neural network based on the plurality of positive images associated with the user identifier of the user.

13. The system of claim 12, wherein the at least one processor is further programmed and/or configured to:
receive at least one other image, wherein the at least one other image includes another set of multiple items, and wherein the at least one other image is not associated with the user;
determine a distance between the at least one other image and at least one positive image of the plurality of positive images associated with the user;
determine the at least one other image as at least one negative image including a negative set of multiple items based on the distance satisfying a threshold distance;
associate the at least one negative image with the user identifier of the user; and
train the neural network based on the at least one negative image associated with the user identifier of the user.

14. The system of claim 13, wherein the first branch of the neural network includes a first fully-connected layer with first weights, wherein the second branch of the neural network includes a second fully-connected layer with second weights, wherein the concatenated embedding is processed with a third fully-connected layer of the neural network with third weights to produce the joint embedding, and wherein the at least one processor is further programmed and/or configured to:
    adjust the first weights, the second weights, and the third weights, based on back propagation using a loss function applied to the user preference score for the set of multiple items.

15. The system of claim 11, wherein the at least one processor is further programmed and/or configured to:
    generate a plurality of user preference scores for a plurality of sets of multiple items;
    rank the plurality of sets of multiple items based on the plurality of user preference scores for the plurality of sets of multiple items;
    determine one or more sets of multiple items of the plurality of sets of multiple items that satisfy a threshold ranking; and
    provide information associated with the one or more sets of multiple items to a user device of the user.

16. The system of claim 11, wherein the at least one processor is further programmed and/or configured to:
    process the image data associated with the single image with at least one convolutional neural network to produce a feature vector for the single image, wherein the feature vector is processed with the first branch of the neural network to produce the image embedding.

17. The system of claim 11, wherein the at least one processor is further programmed and/or configured to:
    encode the user identifier into a one-hot encoding vector in which an index of the vector associated with the user is 1 and a remainder of the index values is 0, wherein the one-hot encoding vector is processed with the second branch of the neural network to produce the user embedding.

18. The system of claim 11, wherein the single image includes a plurality of elements of a matrix, wherein the plurality of elements of the matrix includes the image data associated with the single image, and wherein the matrix includes a number of elements that is greater than a number of items in the set of multiple items.

19. The system of claim 11, wherein the set of multiple items includes at least one of the following: at least one clothing item, at least one furniture item, at least one landscaping item, at least one graphical user interface item, at least one architectural item, at least one artwork item, or any combination thereof.

20. A computer program product including at least one non-transitory computer-readable medium including one or more instructions that, when executed by at least one processor, cause the at least one processor to:
    process image data associated with a single image with a first branch of a neural network to produce an image embedding, wherein the single image includes a set of multiple items;
    process a user identifier of a user with a second branch of the neural network to produce a user embedding;
    concatenate the image embedding with the user embedding to produce a concatenated embedding;
    process the concatenated embedding with the neural network to produce a joint embedding; and
    generate a user preference score for the set of multiple items from the neural network based on the joint embedding, wherein the user preference score includes a prediction of whether the user prefers the set of multiple items.

* * * * *